March 29, 1960  R. E. LINNELL ET AL  2,930,707
PRESERVATION OF COMMODITIES BY REFRIGERATION
Filed Sept. 20, 1956
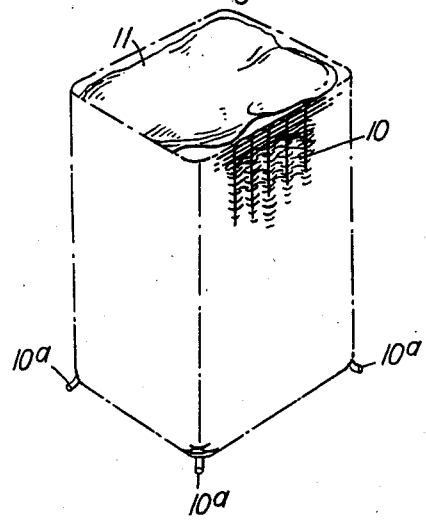
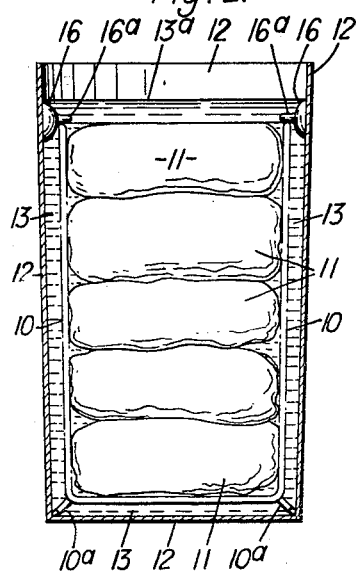
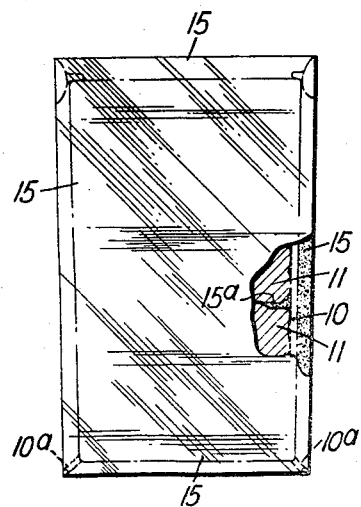
Inventors
Raymond E. Linnell
Peter R. Linnell
By
William B. Red
Attorney

2,930,707

PRESERVATION OF COMMODITIES BY REFRIGERATION

Raymond Eddie Linnell and Peter Robert Linnell, Northampton, England

Application September 20, 1956, Serial No. 611,072

7 Claims. (Cl. 99—192)

This invention relates to the preservation of perishable commodities by refrigeration.

The object of the invention is to enable such commodities to be enclosed in a sealed envelope or jacket of ice or other frozen liquid so that they can be stored in cold chambers thus preserved and protected.

The invention may be applied to commodities where individual items or pieces are preserved separately, for instance pieces or joints of meat, the carcasses of birds, fish and so forth, and also fats or other commodities which are preserved in bulk, for instance in packages or bales.

The invention consists in placing the commodity in a container having preferably liquid-permeable walls, locating the container in spaced relation within an outer container having solid walls, filling up the space between the containers with liquid to a level above the top of the inner container, and freezing it solid, thereby sealing the commodity and the inner container within a jacket of frozen liquid whose shape and size are bounded and determined by the inner contour of the outer container.

In one mode of procedure the commodity is placed within the inner container and frozen before the inner container is placed in the outer container and filled up with liquid for the formation of the jacket.

For convenience in description the inner container will be called a basket and the outer container a can, but these terms are not to be interpreted restrictively.

In some cases the can may remain as part of the frozen package, but in most cases it will serve only as a freezing tank, and the jacket will be removed from it for storage. For instance, after the contents of the can have been frozen solid, the can may be conveniently subjected to a momentary thawing, just sufficient to enable the jacket of frozen liquid, with the basket and contents embedded inside it, to be withdrawn.

The invention will be further described with reference to the accompanying drawings in which:

Figure 1 is a perspective view showing the basket loaded with the commodity, for instance pieces of meat.

Figure 2 is a vertical section showing the loaded basket in position in the can.

Figure 3 is a side elevation partly broken away to reveal the cross-section, showing the frozen jacket in which the basket and its contents are finally enclosed.

Referring to Figure 1 the basket 10 is shown as of woven osier or wicker but it may be of any suitable light liquid-permeable material, such as perforated waxed board or similar expendable carton material, or wire mesh, or perforated metal or plastic. It is shown as of oblong shape with a slight downward taper, but its shape will be governed largely by the nature of the commodity to be contained within it, here indicated at 11 in the form of pieces of meat. The basket will correspond as nearly as practicable to the size and shape of the commodity for which it is designed. It may also be useful to press or mould the meat or other commodity first to a shape to suit the basket in which it is to be placed.

The basket has outwardly extending feet or distance pieces 10ª at the bottom corners to act as distance pieces in locating it in spaced relation in the can 12, Figure 2. In an alternative arrangement these distance pieces are formed in the can instead of on the basket. In some cases both the basket and the can have distance pieces. Before the basket is placed in the can it is preferably first frozen, but this procedure may not always be necessary. When the basket 10 is placed in the can 12, as shown in Figure 2, the space between the basket and the can is filled up with liquid, as indicated at 13, so that the liquid level at the top, indicated at 13ª, is well above the top of the basket. This liquid is usually water, but it may contain various additives: in some cases the syrup in which goods have been previously cooked or treated, or the gravy in which goods have been cooking, or any desired sweetenings or flavourings may be used. Any anti-oxidant or preservatives believed to be non-injurious to health could so far as is legally permitted be added in the case of commodities to be subsequently eaten. In all cases these solutions or suspensions may be suitably diluted as required. In some cases when speed of thawing is desirable is may be convenient to add to the liquid any suitable additive which lowers the temperature at which the liquid will freeze, and consequently on thawing the liquid will leave the basket and goods before the goods themselves are thawed. The liquid will penetrate the interstices or perforations of the basket and fill up the whole space, so that when frozen the commodity and basket will be enclosed in a solid jacket of ice, as indicated at 15, Figure 3. Penetration of the basket is indicated at 15ª. A momentary thawing is all that is necessary to allow of this ice jacket being withdrawn or discharged from the can 12. It will be seen that by the commodity being tightly packed and conforming to the shape of the basket and the basket corresponding to the shape of the can, the ice jacket will not add more than is necessary to the bulk and weight of the commodity.

In some cases the basket may serve to carry the commodity already in the form of a baled package of the appropriate shape. It may even be possible in some cases to make the basket the baling or packaging in which the goods are packed. The bale or packaging may itself have distance pieces such as 10ª or may rest on distance pieces while submerged in the liquid 13. In some cases both the basket and the can form part of the final package in which the commodity is distributed, sold or used.

In some cases it may be necessary to fill up the holes or cavities left by the distance pieces on which the package has rested, after removal from the freezing tank, or can.

In other cases the can 12, which as described serves the purpose of a freezing tank only, may form a part of the packaging. In these cases it may be made of a plastic or of card or other board or the like, plain or corrugated, waxed or waterproofed in any suitable way. It may have an inner lining of foil, parchment, latex or other suitable material or medium. It may be transparent, or as far as possible proof against light or other rays. When used only as a freezing tank however it will usually be made of metal, a plastic, or wood, although a rubber or other flexible tank may be used. The can may be made in two or more parts suitably joined together before use so as to be rendered liquid-tight.

In some cases it may be an advantage to produce a second or third jacket of ice or frozen liquid around the basket, for example to protect the commodity against light or other rays. Moreover it may be necessary in some cases to have jackets of wax or the like, frozen in with suitable protecting material, for example woodwool, or rubber or latex pieces or shavings, extending beyond the jacket to act as a buffer against damage by impact.

In some cases there may be a tendency for the basket to float in the can; any suitable provision may be made to prevent this where necessary, for instance rubber or other suckers 16 may be pressed on to the inner walls of the can near the top, see Figure 2, the suckers having projections 16ᵃ which overhang the rim of the basket and prevent it from rising when the liquid 13 is poured in. Alternatively a metal or other member may be placed on the basket to prevent floating. The basket may have a lid or cover if desired, but this will not usually be needed. It might be preferred to provide the basket with a bottom flange, either continuous or broken, resting on the bottom portion of the can, instead of having merely the feet 10ᵃ. Individual items in the basket may be separated by a sheet of impermeable film to enable layers of separate portions or different goods to be packed if required, and also permit of a speedier separation and thawing out of the commodities. The inner and outer containers or either of them may be in the form of collapsible cartons or be of any other collapsible nature.

By means of the invention we are able to enclose perishable commodities in a sealed envelope or ice or other frozen liquid, in such a way that they can be stored in refrigeration chambers, maintained in a clean and hygienic condition, protected from deterioration which might occur due to exposure to air, even in refrigeration chambers. The ice jacket is sufficiently strong and robust to withstand a reasonable amount of handling without fracture. Moreover once the protecting jacket has been formed it is not always necessary to hold the commodities at very low temperatures, so providing an economy in the cost of refrigeration.

We claim:

1. A method of preserving perishable commodities by refrigeration which consists in placing the commodity in an inner container which is like a basket in that while not entirely rigid, it is of coherent shape and has liquid-permeable walls, locating the inner container in spaced relation within an outer container having solid walls and whose shape corresponds generally with that of the inner container with the spacing being provided by distance pieces on one of the containers, filling up the space between the containers with liquid to a level above the top of the inner container, and freezing the liquid solid, thereby enclosing and sealing the commodity and the inner container within a solid jacket of frozen liquid whose external shape and size are bounded and determined by the inner contour of the outer container.

2. A method of preserving perishable commodities by refrigeration which consists in placing the commodity in an inner container which is like a basket in that while not entirely rigid, it is of coherent shape and has liquid-permeable walls, freezing the commodity in the inner container, locating the inner container in spaced relation within an outer container having solid walls and whose shape corresponds generally with that of the inner container with the spacing being provided by distance pieces on one of the containers, filling up the space between the containers with liquid to a level above the top of the inner container, and freezing the liquid solid, thereby enclosing and sealing the commodity and the inner container within a solid jacket of frozen liquid whose shape and size are bounded and determined by the inner contour of the outer container.

3. A method of preserving perishable commodities by refrigeration which consists in placing the commodity in an inner container which is like a basket in that while not entirely rigid, it is of coherent shape and has liquid-permeable walls, locating the inner container in spaced relation within an outer container having solid walls and whose shape corresponds generally with that of the inner container with the spacing being provided by distance pieces on one of the containers, filling up the space between the containers with liquid to a level above the top of the inner container, freezing it solid thereby enclosing and sealing the commodity and the inner container within a solid jacket of frozen liquid whose shape and size are bounded and determined by the inner contour of the outer container, and subjecting the outer container momentarily to a thawing temperature and withdrawing the commodity with the inner container and the said jacket from the outer container.

4. Means for preserving perishable commodities by refrigeration comprising two containers of similar shape adapted to fit one within the other in spaced relation, the outer container having solid walls and extending above the top of the inner container, the inner container being like a basket in having liquid-permeable walls which while not entirely rigid are competent of maintaining their general shape so that the inner container and its contents can be totally immersed in liquid which can be frozen solid to form a jacket of frozen liquid around the inner container and its contents, and distance pieces on one of the containers for determining the spaced relationship thereof.

5. Means as in claim 4, in which the inner container is made of woven basket work having interstices therein.

6. Means as in claim 4, in which the outer container has adherent to its inner wall near the top, members which overhang the rim of the inner container and prevent floating of the inner container prior to the freezing of said liquid.

7. A package including a perishable commodity preserved by refrigeration consisting of an outer liquid-tight container, an inner container of similar shape to the outer container and located inside the outer container distance pieces on one of the containers for holding the containers in spaced relationship, the inner container having liquid-permeable walls which while not entirely rigid are of coherent shape like the walls of a basket so that it retains its general shape in use and is at the same time able to yield when water inside it expands on being frozen, the inner container being of less height than the outer container and positioned with the walls of the outer container extending above the top of the inner container, a perishable commodity in frozen form located within the inner container, and a solid jacket of frozen liquid filling the space between the containers and around the commodity and extending above the top of the inner container.

References Cited in the file of this patent

UNITED STATES PATENTS

| | | |
|---|---|---|
| 1,129,716 | Ottesen | Feb. 23, 1915 |
| 1,388,296 | Petersen | Aug. 23, 1921 |
| 1,936,814 | Wetta | Nov. 28, 1933 |
| 2,174,649 | Bailey | Oct. 3, 1939 |
| 2,664,358 | Eichler | Dec. 29, 1953 |

FOREIGN PATENTS

| | | |
|---|---|---|
| 348,443 | Great Britain | May 14, 1931 |